April 6, 1937.    H. W. ALDEN    2,076,218
SEALING DEVICE FOR RELATIVELY ROTATABLE PARTS
Filed Jan. 22, 1934
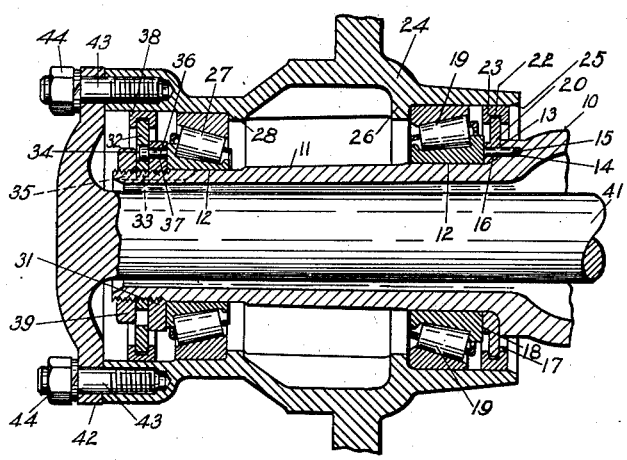
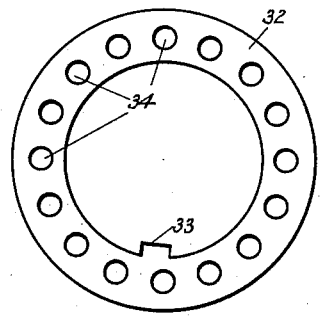
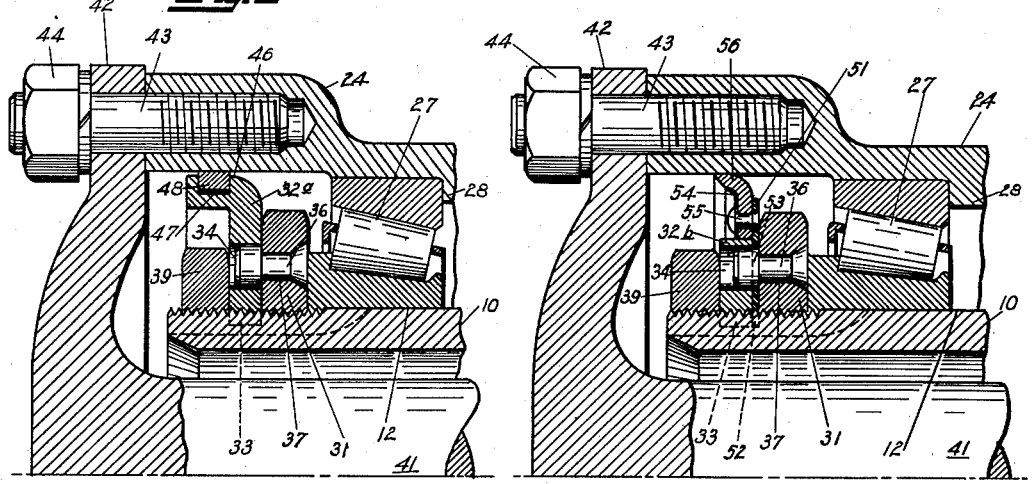
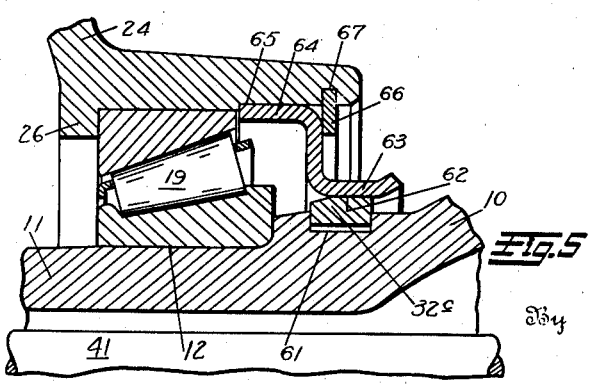
Inventor
Herbert W. Alden
By
Strauch & Hoffman
Attorney Patented Apr. 6, 1937

2,076,218

UNITED STATES PATENT OFFICE 2,076,218

SEALING DEVICE FOR RELATIVELY ROTATABLE PARTS

Herbert W. Alden, Detroit, Mich., assignor to The Timken-Detroit Axle Company, Detroit, Mich., a corporation of Ohio Application January 22, 1934, Serial No. 707,836

4 Claims. (Cl. 308—187.1)

The present invention relates to improved seals for confining lubricant within the hollow housings and bearing assemblies of rotating shafts.

A device of the character contemplated by the present invention is particularly designed and adapted to seal lubricant within the wheel bearings of automobile drive axles. It is not limited, however, to use in constructions of this character but may be employed in any association wherein it is desirable to seal a rotating shaft or the like in liquid tight relation to other rotating or non-rotating sleeves or supports.

Considerable difficulty has been experienced in sealing the wheel bearings of a drive axle against the housing grease. When the driving gearing becomes warm and particularly so on summer days, the housing grease becomes thin and tends to run out toward the wheel along the axle shaft or housing and thus into the wheel bearings. The grease required at the wheel bearings is necessarily very much heavier than that required at the driving gears. When the thinned housing grease gets into the wheel bearings, it thins their grease and thus has a detrimental effect upon them. The space in which an oil closure could be placed between the wheel bearings and the housing bowl is necessarily very restricted. It is not restricted adjacent the housing bowl. However, this form of closure is not very satisfactory as it does not prevent the wheel bearing grease from running down to the axle shaft. All it does is to prevent the housing grease from flowing into the wheel bearings. Moreover due to its location it is difficult to service.

Inasmuch as the volume of grease around the wheel bearings is small in proportion to the amount of grease in the housing bowl, it is quite important that none leak out as would be the case with the oil closure on the inner end of the axle shaft. Therefore, the most favorable place for the oil closure is at the outer end of the axle shaft adjacent the wheel bearings, which space is necessarily very restricted. The restriction is caused by the desire of having the end of the axle shaft as close to the wheel bearings as possible to cut down overall length.

Difficulties have been experienced with various types of fibrous and leather seals that have been proposed prior to the present invention. Metallic seals also have been proposed but they have not been entirely satisfactory and moreover, have been too bulky to properly meet space limitations and too inconvenient to assemble.

It is, therefore, a primary object of the present invention to provide an oil seal assembly that is highly efficient, simple to manufacture and assemble and free from the failures incident to the use of the prior seals proposed for utilization in assemblies of the character mentioned above.

More specifically it is an object of the present invention to provide a seal ring which may be utilized to prevent the oil used for lubrication of the differential of an automotive drive axle from mixing with the wheel bearing grease as well as preventing the wheel bearing grease from being lost through the inner open side of the wheel hub.

A further object of the present invention resides in the provision of an oil seal wherein the washer, commonly utilized behind the bearing retaining nut, forms the support for the sealing means proper.

Another object of the present invention resides in the provision of an oil seal assembly wherein the seal assembly is retained in its sealing relation within the hub or sleeve which is to be sealed, by means of the nut that is utilized to maintain the bearing against axial displacement.

A still further object of the present invention resides in the provision of a resilient ring having a circumferential channel adapting it for support in sealing engagement with a rotatable shaft or sleeve.

A further object of the present invention resides in the provision of a radially expansible ring assembly for sealing the inner surface of a sleeve with respect to which the ring assembly is relatively rotatable.

Another object of the present invention resides in the provision of an oil seal for use with relatively rotatable members embodying a bearing assembly wherein a threaded member provided with lateral apertures is associated with one of said members for adjusting the bearings and cooperates with a seal supporting ring provided with a radial tongue which prevents rotation of the ring and nut, thereby retaining the threaded member in adjusted position.

A further object of the present invention resides in the provision of a seal supporting member provided with a tongue which is adapted to retain it against rotation with respect to one of said members and which is laterally apertured at diametrically opposed points in off-set relation to said tongue whereby reversal of the supporting member permits double the number of operative positions of said member with respect to a laterally disposed pin carried by a member threaded into the rotatable member to adjust the bearings.

Another object of the present invention resides in the provision of an expanding seal ring assembly that is relatively simple and inexpensive to manufacture, and that is capable of being assembled prior to positioning it with respect to the structure to be sealed.

Still further objects will appear as the description proceeds in connection with the appended claims and the accompanying drawing wherein:

Figure 1 is a longitudinal sectional view taken through one end of a drive axle and wheel hub assembly of an automotive vehicle with the novel oil seal of the present invention applied thereto.

Figure 2 is a plan view of the combination washer and supporting ring utilized in the embodiment of the invention disclosed in Figure 1.

Figure 3 is a view similar to Figure 1 but showing a modified form of seal at the outer extremity of the axle housing.

Figure 4 is a view similar to Figure 3 showing a further modified form of seal forming part of the present invention.

Figure 5 is a fragmental sectional view showing a modified form of seal associated with the inner end of the wheel hub.

With continued reference to the drawing wherein like reference characters are used to designate the same parts throughout the several figures the numeral 10 designates generally one end of an axle housing of the type utilized with drive axles of the full floating type designed to be supported within a wheel hub 24.

The housing end 10 is provided with a tapered portion 11 which is provided with two cylindrical seats 12 which are adapted to receive the inner races of suitable bearings to be hereinafter described. Inner bearing seat 12 terminates at one end in a radial shoulder 13. Shoulder 13 is suitably apertured at 14 for the reception of a pin 15. Pin 15 projects outwardly from the face of shoulder 13 and is adapted to fit into an aperture 16 formed in an annular ring member 17.

Ring 17 is composed of a relatively thick inner collar portion 18 which abuts the face of shoulder 13 on one side and the inner race of a roller bearing assembly 19 on the other side; and a relatively thin annular flange 20 formed as an integral radial extension of collar 18 on the side thereof abutting shoulder 13. This flange is suitably machined to fit within a groove 22 formed in the inner face of an inherently expansible split ring 23. This expansible ring preferably is snapped upon the flange before the ring is fitted to the pin 15.

After ring 23 is associated with its supporting ring 17 in the manner above outlined the assembly thus formed may be positioned upon housing 10 and moved axially into its operative position upon pin 15. When in this position it will be apparent that ring 17 is prevented from undergoing rotative movement with respect to the housing 10. Bearing assembly 19 is then moved into its assembled position on seat 12 and retains the ring 17 against axial movement due to the abutting of the lower race against rim 18 of ring 17. Wheel hub 24 is then placed in position with respect to housing 10 by moving it axially of the housing 10 and over the bearing 19 and the seal ring 23. In order to insure free assembly of hub 24 over the ring 23 the inner end of hub 24 is suitably beveled at 25 in order that the ring 23 will be contracted into its sealing relation automatically as the hub is moved axially to its final operative position. Hub 24 is furthermore provided with an internal annular shoulder 26 which contacts the outer bearing race of bearing assembly 19 and maintains the inner race upon its seat 12 and against rim 18 of ring 17.

With the parts so far described in position as above pointed out a second bearing assembly 27 is placed upon the outer seat 12, and the outer race of bearing 27 is forced into abutting engagement with an internal annular shoulder 28. The inner race of bearing 27 is retained on its seat 12 by means of a nut 31 which is threaded upon the outer screw threaded end of the sleeve 10. This nut 31 is utilized to axially adjust both of the described bearing assemblies and to hold them in proper position. It, therefore, serves to retain the wheel hub upon the axle sleeve.

A ring or washer 32 is positioned on the sleeve end and forced against the nut 31 by a jam nut 39. This washer has an inwardly projecting tongue 33 and a plurality of apertures 34, as best seen in Figure 2. The tongue 33 is associated with a longitudinal groove 35 which is suitably provided in the extension 11 of the axle housing 10 for the purpose of preventing rotational movement of ring 32. Apertures 34 are provided in ring 32 in order that one of said apertures may be associated with the head of a pin 36 which is frictionally received in an aperture 37 provided in the nut 31. It will be apparent that the alignment of pin 36 with any aperture 34 will be dependent upon the degree of rotation of nut 31 necessary to ultimately assure proper tightening of the wheel hub and bearings. Due to this variable adjustment of nut 31 the pin 36 may assume any angular position with respect to the groove 35 and the position of the pin 36 will vary as the nut 31 is adjusted to take up the wear in the bearings. In order to allow for this variation in the angular disposition of pin 36 the apertures 34 are disposed in angularly off-set relation (about 5 degrees in the illustration), to the tongue 33 whereby the number of apertures can be in effect doubled merely by reversing the washer 32 upon the housing sleeve 11. A finer bearing adjustment is thus obtainable, and the pin 36 prevents rotation of the nut 31 from adjusted position.

The washer 32 serves as a support for a split seal ring 38, which is substantially identical in construction to the ring 23 previously described. This channeled expansible ring 38 is of course snapped upon the rim of the washer prior to the time that the latter is placed upon the housing sleeve.

With the structure just described in its assembled position, a drive axle shaft 41 is telescopically associated with housing 10 and a flange 42 on the axle shaft is secured to wheel hub 24 by studs 43 and nuts 44.

From the foregoing description it will be apparent that a very simple and effective means is provided for sealing the wheel hub against loss of lubricant and preventing the relatively light differential grease from mixing with the bearing grease.

The above described invention provides a seal which is capable of use in the restricted space provided in assemblies of the above character. The present seal assembly makes use of the lock washer, which retains the adjusting nut in its set position, for supporting the seal in this and the other embodiments disclosed in the drawing. Such an arrangement greatly simplifies the construction in that no additional members need be inserted in the already crowded space upon the end of the axle housing. Although the present invention is preferably designed as above indicated it is within the purview thereof to modify the support in many ways without departing from the scope of the appended claims. One modification may take the form of an annular ring adapted to be non-rotatably associated with the outer member and projecting into an external groove formed in a ring which is adapted to contract and thereby seal the inner member. For example, the present illustrated embodiments of the invention or such a modified device may be used for sealing a rotating shaft such as the propeller shaft of a boat and such assemblies are contemplated by the claims when they are used in installations of this character.

In Figure 3 there is shown a modified form of the invention wherein the only changes that have been made are in the seal ring and its support. In this form of the invention a supporting ring or washer 32a is substituted for the ring 32. Ring 32a is adapted to perform all of the functions attributed to ring 32 and differs therefrom only in the fact that the outer periphery thereof is provided with an axially extending flange 46. Flange 46 is provided with an annular groove 47 which is adapted to receive a split expanding ring 48. A similar modification may be utilized to seal the inward end (not shown in Figure 3), of the hub 24. This inverted relationship between the ring and the washer is obtainable, when lateral support for the ring is desired, without sacrifice of compactness in the completed structure, as the flange 46 is of about the same width as the thickness of the nut 39 and hence surrounds the latter without extending beyond the natural end of the sleeve 10.

In Figure 4 a further modification is shown. In this form of the invention a thin metal washer 51, with an internal tongue 52 and apertures 53 identical in construction to washer 32, except for thickness, is positioned between adjusting nut 31 and a modified simple washer 32b. The seal of this modification comprises a leather or composition ring 56 provided with a thin and somewhat resilient metallic outwardly fingered backing ring or plate 54. Rings 53 and 54 are secured to washer 51 by means of rivets 55 or the like. The washer 51 prevents rotation of the leather and lends lateral support thereto, while the plate 54 yieldingly maintains the leather in its outer radial position. In operation and assembly this form of the invention is substantially identical with the previously described forms.

Although all of the forms above described are satisfactorily operable and efficient in use, the form shown in Figure 1 of the drawing is preferable since it requires the least modification of the standard parts, and is more compact, simpler, and less expensive to manufacture.

In Figure 5 a further modification, especially designed for use at the inner end of the hub, is shown. In this form of the invention a resilient seal ring 32c is inserted in a groove 61 which is provided in the housing 10. The ring 32c herein shown is of the expanding ring type and is adapted to contact the sealing surface 62 of a removable member 63. The removable member preferably is formed by pressing a sheet metal blank into the illustrated annular form. The member 63 has a flange 64 adapted to fit within an annular groove 65 formed in wheel hub 24. A retaining ring 66 is snapped into a groove 67 in wheel hub 24 and retains the ring 63 in assembled position within the hub. A seal of this type has the advantage of reducing the machining operations to a minimum since it is only necessary to machine the groove 61. No other fine machining operations are necessary since the blank from which the ring 62 is made is already smooth and polished. Further advantages are that the weight adjacent the inner end of the hub is reduced by omitting considerable metal of the housing adjacent the inner end of hub 24; and that the sealing ring is brought inwardly toward the hub axis where the centrifugal action on the lubricant is smaller, with lessened tendency for the lubricant to escape.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a journal construction, an elongated hollow cylindrical support, said support adapted to be stationarily mounted upon a vehicle or the like, a wheel structure having an elongated cylindrical portion fitting over, but spaced from said support, an anti-friction bearing disposed between said support and said wheel portion and comprising an inner race closely fitting over said support and an outer race closely fitting into said wheel structure, an axle shaft extending through said support and connected to said wheel structure, a nut threaded onto said support and abutting the inner race of said bearing, a second nut threaded onto said support, and a combined fluid seal and nut locking assembly clamped between said nuts, said assembly comprising a sealing member which frictionally cooperates with the inner surface of said wheel structure in static, fluid sealing engagement therewith.

2. The journal construction described in claim 1, wherein said fluid seal and nut locking assembly comprises an annular disc-like member having a radially expansible sealing ring mounted on its periphery and capable of undergoing radially inward and outward movements with respect thereto, said sealing ring being frictionally rotatably driven by contact with the inner surface of said wheel structure, and being slidably but sealingly related to the part of said assembly which is clamped between said nuts.

3. The journal construction described in claim 1, wherein said combined fluid seal and nut locking assembly comprises an annular disc clamped between said nuts and a channel shaped sealing ring rotatively fitting over said disc and frictionally coupled to the inner surface of said wheel structure in static, fluid sealing engagement therewith.

4. In a journal assembly, an inner member and an outer member disposed in telescoping relationship and adapted to undergo relative rotation, said members being of generally cylindrical form; an anti-friction bearing assembly disposed between said members and comprising an outer race secured to said outer member and an inner race fitting over said inner member; a pair of nuts threaded onto said inner member and operable to maintain said inner race in proper axially adjusted position; and a sealing device clamped between said nuts and operable to prevent fluid flow between said members in an axial direction, said sealing device comprising a supporting element which is rotatively fixed with respect to said inner member, and a metallic sealing ring which is frictionally coupled to said outer member and which is slidably but sealingly mounted upon said supporting element, said sealing member inherently tending to expand and frictionally engaging a smooth cylindrical surface provided on the inner wall of said outer member adjacent said outer race, and disposed in static fluid sealing engagement therewith.

HERBERT W. ALDEN.